United States Patent [19]

Dietl

[11] Patent Number: 5,271,755
[45] Date of Patent: Dec. 21, 1993

[54] METHOD OF JOINING CORRUGATED GLASS PLATES OF BOROSILICATE GLASS

[75] Inventor: Steffen Dietl, Hackenheim, Fed. Rep. of Germany

[73] Assignee: Schott Glaswerke, Mainz, Fed. Rep. of Germany

[21] Appl. No.: 937,030

[22] Filed: Aug. 31, 1992

[30] Foreign Application Priority Data

Aug. 29, 1991 [DE] Fed. Rep. of Germany ....... 4128675

[51] Int. Cl.$^5$ .............................................. C03B 23/20
[52] U.S. Cl. ........................................... 65/42; 65/44
[58] Field of Search ............... 428/180, 183, 184, 185, 428/182; 261/112.2; 65/33, 36, 41, 42, 44, 152; 202/152, 153, 158, 267.2; 156/210, 89

[56] References Cited

U.S. PATENT DOCUMENTS 2,789,803  4/1957  Doty .................................. 202/158
4,028,442  6/1977  Eckert .............................. 202/158

OTHER PUBLICATIONS

M. Borom, "The Mechanical and Chemical Aspects of Glass Sealing—Part II", The Glass Industry, Apr. 1978, p. 19.

Primary Examiner—Michael W. Ball
Assistant Examiner—Richard Crispino
Attorney, Agent, or Firm—Millen, White Zelano, & Branigan

[57] ABSTRACT

For joining corrugated glass plates of borosilicate glass in heavy-duty packings for columns, the corrugated glass plates are placed one on top of another in the desired way and heated for 6–15 minutes at a temperature of 200–230K above their transition temperature Tg. The corrugated glass plates are fused together at their contact points and form an extraordinarily firm bond without the corrugated glass plates being deformed thereby. The composite is so stable that it can be utilized as a column supporting grate.

4 Claims, 2 Drawing Sheets

METHOD OF JOINING CORRUGATED GLASS PLATES OF BOROSILICATE GLASS

BACKGROUND OF THE INVENTION

This invention relates to a method for joining corrugated glass plates of borosilicate glass for making heavy-duty packing for mass transfer equipment.

In many modern mass transfer operations such as, for example, distillation, structured packing is employed as a preferred and more efficient replacement for the older simple bulk packing, such as, e.g., Raschig rings. The elements of structured packing consist of obliquely corrugated plates placed in contact with one another in alternatingly oppositely oriented fashion so that open intersecting channels are formed extending obliquely to the column axis (for example, DAS 1,300,511). As a result, a substantial improvement is obtained in the contact between the liquid phase and the vapor phase, and thus in the degree of efficiency of the packing as compared with that of a bulk packing. By offsetting the individual packing bundles with respect to one another by, in each case, 90°, a further intermixing of the phases is achieved.

These bundles or packs of packing are comprised of various materials, such as ceramic, stainless steel, other metal alloys, as well as of synthetic resins (e.g., British Patent 1,391,307) or coated and shaped glass fiber structures (e.g., British Patent 1,471,442). Furthermore, packing bundles made of corrugated glass plates are also conventional (DE 3,909,995 C1).

The individual corrugated plates are joined together by sintering in the case of a ceramic and by spot welding in the case of steel. Plates made of synthetic resins, as well as the coated glass fiber fabrics known, for example, from British Patent 1,741,442, are generally glued together. In the heavy-duty pack of corrugated glass plates known from DE 3,909,995, bonding of the individual plates to one another is achieved mechanically, i.e., by means of a strap placed around the corrugated plate pack, or by cementing with an inorganic adhesive or by bonding with the aid of a glass solder.

This heavy-duty pack of corrugated glass plates known from DE 3,909,995 C1 exhibits, however, still certain drawbacks under practical conditions. In the case of the corrugated glass plates held together by a strap, the individual corrugated glass plates must first be cut to the size of the inside correspondence diameter of the column; then they must be carefully assembled so that the strap can be wrapped around the assembly. The cutting to size of the individual corrugated glass plates is labor-intensive and costly. In the cemented or soldered corrugated glass plates, the glass adhesive or the glass solder must always be positioned precisely at the points of the intersection of the individual corrugations of the various corrugated glass plates, which is a technically complicated step which likewise leads to additional costs.

SUMMARY OF THE INVENTION

It is an object of the invention to provide a method of forming corrugated glass plates of borosilicate glass in a simple and permanent manner. Another object is to provide the products produced thereby which are especially suitable as heavy-duty packing for distillation columns and the like.

Upon further study of the specification and appended claims, further objects and advantages of this invention will become apparent to those skilled in the art.

To attain these objects there is provided a method of making structured packing for mass transfer operation, said method comprising placing corrugated glass plates of borosilicate glass on top of one another so that the corrugation of said plates are offset, thereby forming contact points between said plates, heating said plates for 6–15 minutes at a temperature of 200–230K above the transition temperature $T_g$ of the borosilicate glass.

The corrugated glass plates, stacked in the desired fashion, are heated for a time period of 6–15 minutes at a temperature of 200–230K above the transition temperature $T_g$ of the borosilicate glass. Thereby, a permanent and stable welding bond and/or fusion is unexpectedly formed at the contact points of the individual corrugated glass plates without the latter losing their shape.

If the heating time is shorter, the joint between the glass may be weak, if the time is longer, the curved plates tend to flatten. The same occurs with the heating temperature. If the temperature is lower than 200K above $T_g$, then the joint gets weak or no joint is formed at all in a reasonable time. If the temperature is higher than 230K above $T_g$, the plates tend to flatten.

Corrugated glass plates of borosilicate glass 3.3 in particular can be joined by heating the plates for 6–15 minutes at a temperature of 725°–755° C. Borosilicate glass 3.3 is a standardized borosilicate glass, the characteristic values of which are determined in the norm DIN/Iso 3585, of which the thermal expansion $\alpha$ is about 3.3. To this class belong the well known "PYREX" glass of Corning 0.4 $K_2O$; 0.3 CaO) or "DURAN" of Schott (composition ca. 79.7 $SiO_2$, 10.3 $B_2O_3$; 3.1 $Al_2O_3$; 5.2 $Na_2O$; 0.8 CaO; 0.9 MgO), all compositions taken from Scholze, Horst: "Glas Natur, Struktur und Eigenschaften," Springer-Verlag, New York Heidelberg Berlin, 3rd ed., 1988 (ISBN 0-387-18977-7), page 178.

The heating rate at which the corrugated glass plates are heated to the bonding temperature is suitable chosen to be maximally high in order to keep the cycle times at a minimum value. However, the heating rate must not be so high that the plates crack during heating. Normally, satisfactory results are achieved with heating rates of between 3 and 5K/min., starting from room temperature. This heating rate is especially suited for larger stacks of plates because the whole stack should be heated very uniformly to give good results. For short production cycle times, the heating rate should be as great as possible with the proviso that the stack is heated uniformly. When using high heating rates, it can be advantageous to provide a pause (ca. 15–30 minutes) in the heating up procedure at about $T_g$ in order to be assured that the whole stack reaches this temperature. The reason behind this is that the thermal conductivity of glass at lower temperatures is relatively low but increases at higher temperatures. So if the whole stack reaches a higher temperature which is achieved by this pause, the further heating up is simplified and also can be accomplished at a higher heating rate in order to obtain a uniform heat distribution within the stack.

The stability of the thus-formed composite of corrugated glass plates is excellent. An extraordinarily firm welding bond and/or fusion of the glass plates is obtained during the heat treatment at the contact points of the individual corrugated glass plates. Thus, the resultant bond advantageously possess the same overall chemical composition and thermal expansion coefficient. The desired heavy-duty packing can be readily produced from the plate packs, fused together according to this invention, in any desired dimensions by sawing or drilling. Packing can be cut without difficulties from the joined pack of corrugated glass plates with an accuracy of ±0.1 mm so that, with column channels in the column being provided with corresponding accuracy, there is a marginal gap of merely about 0.2 mm between packing and inner wall of the column. It is thereby possible to omit separate marginal gaskets between packing and inner wall of the column.

The novel method also makes it possible to utilize, without difficulties, corrugated glass plates roughened by sandblasting or by other means prior to being welded or fused together, in order to attain increased surface area, sometimes desirable in distillation and the like.

The individual corrugated glass plates can also be stacked without problems up to a height of 50 cm for the purpose of being bonded by the thermal treatment. Beyond this value, there is the danger of deformation of the lower-most layers.

The bond between the individual corrugated glass plates according to this invention is of such mechanical stability that a panel from the composite, correspondingly cut to size, can be readily utilized as a chemically, especially chemically-resistant, supporting for a distillation column and the like.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF FIGURES

Figure 1:
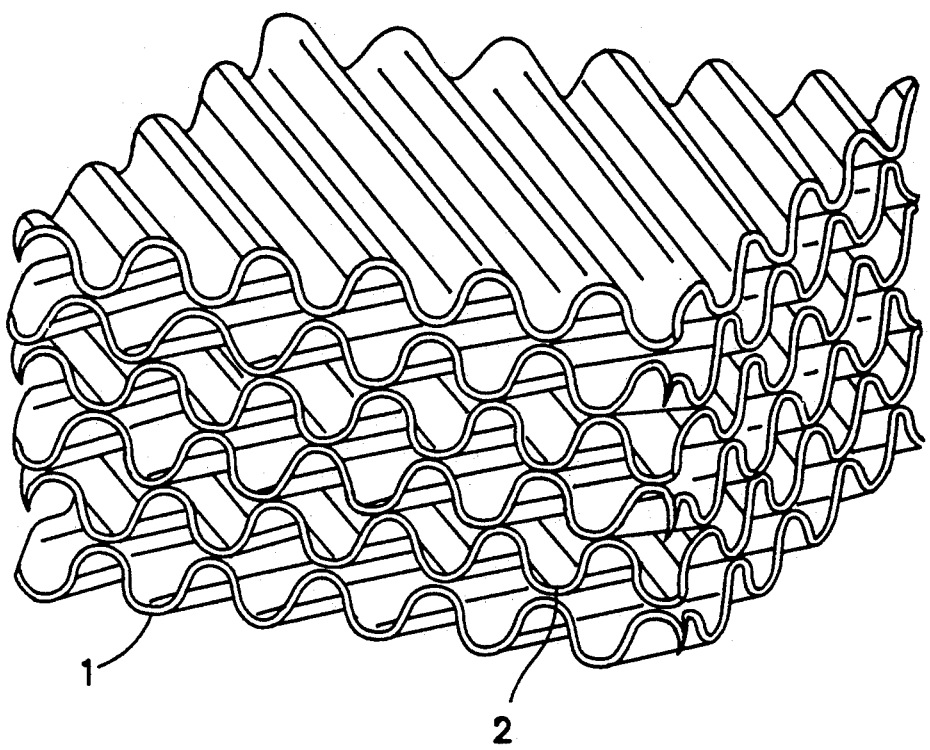
FIG. 1 is an isometric view of a pack of corrugated glass plates.

FIG. 1 depicts a pack of six borosilicate glass corrugated plates 1 placed one on top of the other in alternating opposition and being fused together at all contact points 2 of the apices of the corrugations.

Figure 2:
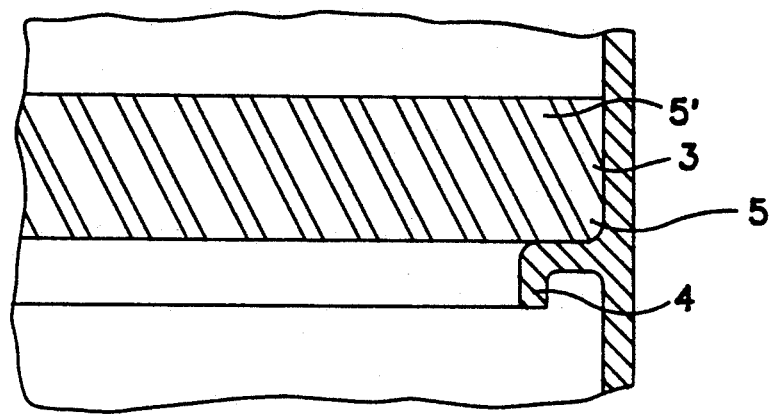
FIG. 2 is an elevational view in cross section of a column with a supporting grate of corrugated glass plates.
Figure 3:
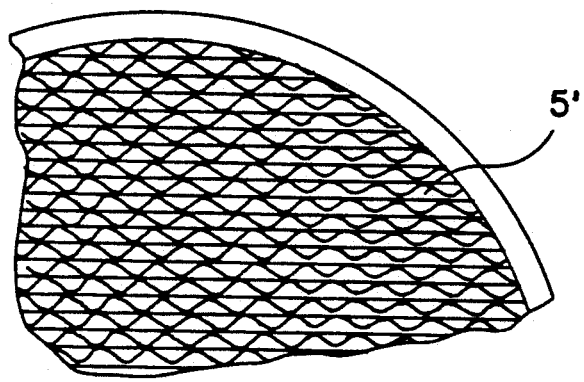
FIG. 3 is a partial top view of the grate of FIG. 2.

FIG. 2 is a fragmentary view of a column section in which a supporting grate 3 is employed, said grate being a pack of corrugated glass plates made in accordance with this invention. The supporting grate 3 is retained in the column by the supporting ring 4 mounted to the inside of the column. The diameter of the supporting grate 3 corresponds to the nominal inside diameter of the column. The thickness of the column supporting grate is dimensioned so that it can bear the weight of the packing resting thereon. The cross-sectional area of the passages 5, 5' of the column supporting grate are dependent on the corrugation height of the corrugated glass plates employed. The cross-section must, of course, be dimensioned so that no bulk packing or catalysts or the like can fall through or into these passages.

It is also possible to combine corrugated glass plates alternatingly with flat glass plates, or to use corrugated glass plates having different corrugation heights.

Without further elaboration, it is believed that one skilled in the art can, using the preceding description, utilize the present invention to its fullest extent. The following preferred specific embodiment is, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, and of corresponding German application P 41 28 675.8, are hereby incorporated by reference.

EXAMPLE

Fifteen sinusoidal corrugated plates (30×30 cm²) of borosilicate glass "DURAN" (Tg=525° C.) of a thickness of 2 mm, a height of the corrugations of ±6.5 mm (13 mm height from peak to peak) and a distance of the undulations of ca. 13 mm (peak to peak) are stacked up and heated in an electrical furnace (produced by UHLIG, type 2300, having a heated volume (muffle) of 45×60×90 cm³ and a heating power of 12 kW) with a heating rate of ca. 5° C./min. up to a temperature of 735° C. and is held at this temperature for about 5 minutes. Thereafter, the furnace is switched off and the stack is cooled with a cooling rate of about 5° C./min. to about 650° C. and then with a lower cooling rate (ca. 2.5°-4° C.) to below Tg to avoid any strains. Thereafter, the cooling rate may be increased, such cooling procedures being well known in the art. The plates are strongly welded together at the points of contact without losing their shape.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of making a pack of structured packing for mass transfer operations, said method comprising placing corrugated glass plates of borosilicate glass on top of one another so that the corrugation of said plates are offset, thereby forming contact points between said plates, heating said plates for 6–15 minutes at a temperature of 200-230K above the transition temperature Tg of the borosilicate glass.

2. A method of making corrugated glass plates according to claim 1, wherein the corrugated glass plates are of borosilicate glass 3.3 (International Standard 3585:1991) and are heated for 6–15 minutes at a temperature of 725°–755° C.

3. A method according to claim 1, wherein the glass plates are heated, starting from room temperature at a rate of 3–5K/minute; and, at about the transition temperature, Tg, heating is stopped for about 15–30 minutes, and then heating is resumed.

4. A method of making corrugated glass plates according to claim 3, wherein the corrugated glass plates are of borosilicate glass 3.3 (International Standard 3585:1991) and are heated for 6–15 minutes at a temperature of 725°–755° C.

* * * * *